US009439226B2

(12) United States Patent
Veikkolainen et al.

(10) Patent No.: US 9,439,226 B2
(45) Date of Patent: Sep. 6, 2016

(54) METHOD AND APPARATUS FOR INITIATING RADIO CONNECTIONS

(75) Inventors: Simo Pekka Veikkolainen, Masala (FI); Markus Isomäki, Espoo (FI); Binoy Chemmagate, Espoo (FI)

(73) Assignee: Nokia Technologies Oy, Espoo (FI)

( * ) Notice: Subject to any disclaimer, the term of this patent is extended or adjusted under 35 U.S.C. 154(b) by 68 days.

(21) Appl. No.: 14/003,623

(22) PCT Filed: Mar. 15, 2011

(86) PCT No.: PCT/FI2011/050219

§ 371 (c)(1),
(2), (4) Date: Sep. 23, 2013

(87) PCT Pub. No.: WO2012/123617

PCT Pub. Date: Sep. 20, 2012

(65) Prior Publication Data

US 2014/0140284 A1    May 22, 2014

(51) Int. Cl.
*H04W 76/02* (2009.01)
*H04L 29/08* (2006.01)
*H04W 72/04* (2009.01)
*H04W 76/04* (2009.01)

(52) U.S. Cl.
CPC .............. *H04W 76/02* (2013.01); *H04L 67/02* (2013.01); *H04W 72/04* (2013.01); *H04W 76/048* (2013.01)

(58) Field of Classification Search
None
See application file for complete search history.

(56) References Cited

U.S. PATENT DOCUMENTS

| | | | | |
|---|---|---|---|---|
| 2006/0294223 A1* | 12/2006 | Glasgow | ............. | H04L 67/2847 709/224 |
| 2011/0153807 A1* | 6/2011 | Vicisano | ........... | H04L 29/12066 709/224 |
| 2012/0002614 A1* | 1/2012 | Ekici | ..................... | H04W 48/18 370/329 |
| 2012/0005745 A1* | 1/2012 | Wei et al. | ........................ | 726/15 |
| 2012/0084343 A1* | 4/2012 | Mir | ................... | H04L 29/12066 709/203 |

OTHER PUBLICATIONS

International Search Report and Written Opinion received for corresponding Patent Cooperation Treaty Application No. PCT/FI2011/050219 , dated Jun. 8, 2011, 12 pages.
Wang Z. et al. "Prefetching in World Wide Web", Global Telecommunications Conference, 1996. Globecom '96. Communications: The Key to Global Prosperity London UK Nov. 18-22, 1996, New York, NY, USA, IEEE, US, Nov. 18, 1996 pp. 28-32.

(Continued)

*Primary Examiner* — Diane Lo
(74) *Attorney, Agent, or Firm* — Seppo Laine Oy

(57) ABSTRACT

In accordance with an example embodiment of the present invention, there is provided an apparatus comprising a user interface receiver configured to receive at least one indication of user activity, at least one processing core configured to initiate packet-based connectivity over a radio communications interface responsive to the at least one indication of user activity, wherein the at least one indication of user activity comprises at least one indication relating to operating a web browser, the at least one indication not indicating a user request to fetch a resource for display on the browser.

10 Claims, 4 Drawing Sheets

(56) References Cited

OTHER PUBLICATIONS

Cohen E. et al. "Prefetching the means for document transfer: a new approach for reducing Web latency", Computer Networks, Elsevier Science Publishers B.V., Amsterdam, NL, vol. 39, No. 4, Jul. 15, 2002, pp. 437-455.

Potmesil M. "Maps alive: viewing geospatial information on the WWW", Computer Networks and ISDN Systems, North Holland Publishing, Amsterdam, NL, vol. 29, No. 8-13, Sep. 1, 1997 pp. 1327-1342.

* cited by examiner

US 9,439,226 B2

METHOD AND APPARATUS FOR INITIATING RADIO CONNECTIONS

RELATED APPLICATION

This application was originally filed as PCT Application No. PCT/FI2011/050219 filed Mar. 15, 2011.

TECHNICAL FIELD

The present application relates generally to packet-based connectivity between apparatuses and a network.

BACKGROUND

Connectivity comprises circuit-switched connectivity and packet-based connectivity. Packet-based connectivity is associated with various delays which occur due to design choices of packet-based systems. A feature of packet-based systems is forwarding packets, which may involve queuing packets in intermediate routers which incurs delay, the delay being managed using various techniques such as differentiated quality of service, for example. In some networks, packets are transmitted in established packet transfer contexts such as protocol connections, for example. Initiating a protocol connection may involve preliminary steps such as handshaking to establish negotiated connection parameters.

When initiating a packet-based connection, for example from a mobile apparatus, certain preliminary phases may be completed before data packets can traverse the new connection. For example, where a radio link is comprised in the new packet-based connection, a radio bearer may be established to convey the packets over the radio link. Depending on the system other preliminary phases may comprise authentication, initializing ciphering, mobility-related procedures, initiating billing and roaming precedures. Delays associated with preliminary phases may amount to a few seconds, depending on system design, instantaneous load and environmental factors.

When starting from a state where no connection exists, a user requesting resources from a network will wait for a compound delay period, which comprises delays associated with any preliminary phases as well as delays due to network latency. For example, a user of a mobile user terminal clicking a link to a website may wait first for a radio bearer to be initiated, then for authorization for internet access, then for resolving an address for the link, and finally for initiating a protocol connection to the website.

SUMMARY

Various aspects of examples of the invention are set out in the claims.

According to a first aspect of the present invention, there is provided an apparatus comprising a user interface receiver configured to receive at least one indication of user activity, at least one processing core configured to initiate connectivity over a radio communications interface responsive to the at least one indication of user activity, wherein the at least one indication of user activity comprises at least one indication relating to operating a web browser, the at least one indication not indicating a user request to fetch a resource for display on the browser.

According to a second aspect of the present invention, there is provided a method, comprising receiving at least one indication of user activity and initiating connectivity over a radio communications interface responsive to the at least one indication of user activity, wherein the at least one indication of user activity comprises at least one indication relating to operating a web browser, the at least one indication not indicating a user request to fetch a resource for display on the browser.

According to a third aspect of the present invention, there is provided an apparatus comprising at least one processor, at least one memory including computer program code, the at least one memory and the computer program code configured to, with the at least one processor, cause the apparatus to perform at least receiving at least one indication of user activity, initiating connectivity over a radio communications interface responsive to the at least one indication of user activity, wherein the at least one indication of user activity comprises at least one indication relating to operating a web browser, the at least one indication not indicating a user request to fetch a resource for display on the browser.

According to a fourth aspect of the present invention there are provided computer programs and computer-readable storage media configured to store the computer programs, the programs being arranged to cause methods according to the second aspect to be performed when they are run.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
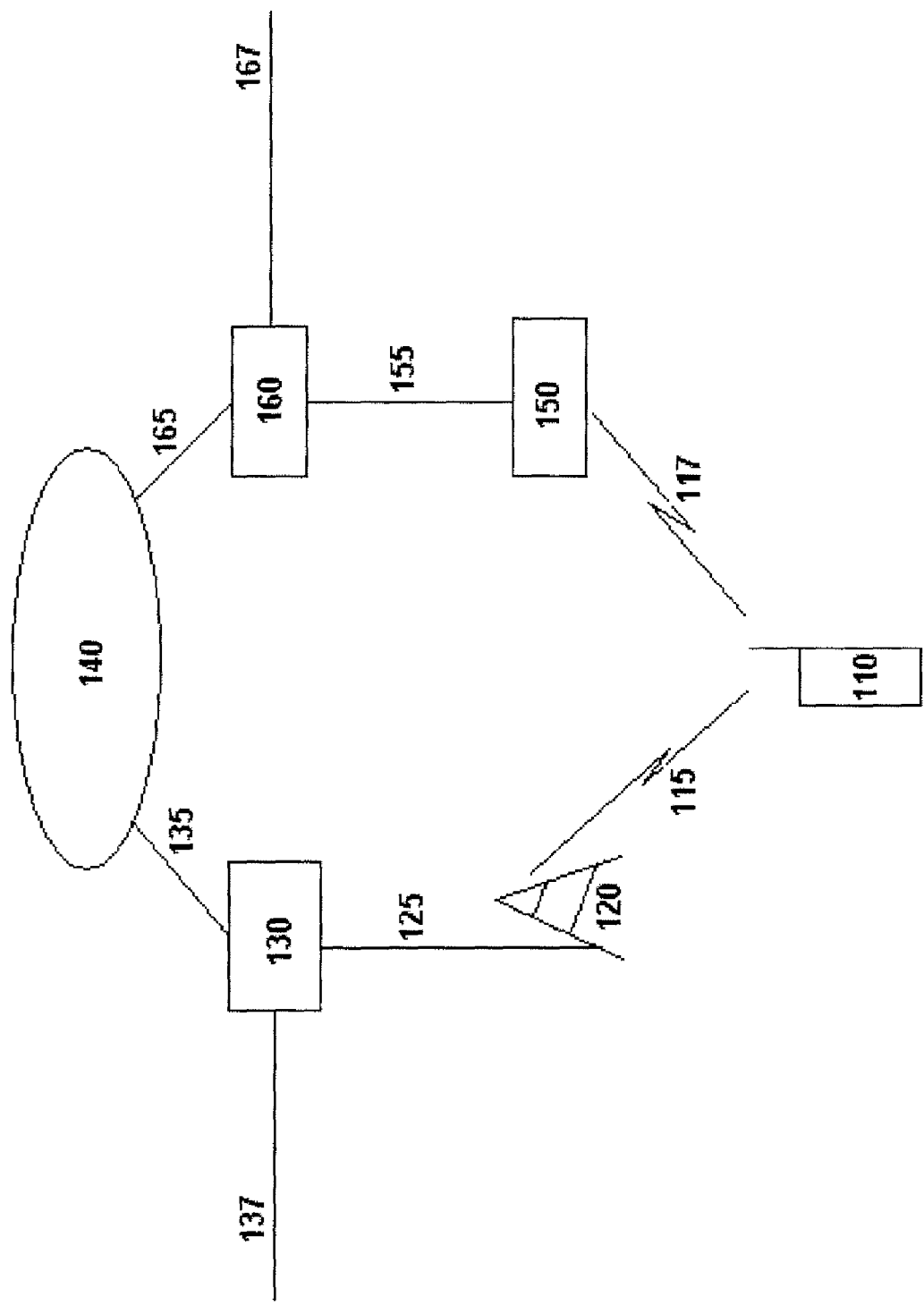
FIG. 1 illustrates an example system where embodiments of the present invention may be employed.

FIG. 1 illustrates an example system where embodiments of the present invention may be employed. Mobile apparatus 110, for example a mobile phone, personal digital assistant, PDA, cellular phone, palmtop computer, laptop or other mobile communications-capable device, is connected to base station 120 by means of wireless link 115. Wireless link 115 may comprise an uplink capable of conveying information from mobile 110 to base station 120 and a downlink capable of conveying information from base station 120 to mobile 110. Wireless link 115 may be in conformance with a cellular technology such as, for example, wideband code division multiple access, WCDMA, global system for mobile communications, GSM or long term evolution, LTE. Mobile 110 may be powered by a battery comprised in mobile 110. Device 110 is herein referred to as a mobile, but it is to be understood that the scope of the description encompasses also embodiments where the device is not mobile.

Base station 120 may be capable of communicating in accordance with at least one, and in some embodiments more than one, cellular technology such as, for example, those mentioned above. Base station 120 may be powered from a stable power source and may be furnished with a backup battery. Base station 120 may be connected to a core network mode 130 by means of connection 125. Connection 125 may be a wire-line connection or, for example, a directional microwave link. Core network node 130 may act as a gateway toward further nodes and may be configured to perform functions relating to controlling a cellular communications network. Examples of such functions include routing, authentication, access control and billing subscribers. Examples of core network nodes include switches, management nodes, serving gateways, support nodes and charging systems. Core network node 130 may connect to further core network nodes, which are not illustrated, by means of connection 137. Core network node 130 may connect to the internet 140 by means of connection 135.

In some embodiments core network node 130 may be absent, in which case base station 120 may be connected directly to other base stations and, optionally, the internet 140. In such cases base station 120 may be furnished with at least some of the core network functions mentioned above. In some embodiments nodes not illustrated in FIG. 1 may be present, for example a base station controller node may be disposed between base station 120 and core network node 130.

In some embodiments, in addition to or instead of the cellular chain comprising base station 120 and core network node 130 mobile 110 may communicate by means of a non-cellular chain comprising access point 150 and gateway 160. Mobile 110 may communicate with access point 150 via link 117 which may operate according to WLAN technology or WiMAX technology, for example. Link 117 may, like wireless link 115, comprise an uplink and a downlink. Access point 150 may be connected to gateway 160 by means of connection 155. Connection 155 may be a wire-line connection such as an Ethernet or digital subscriber line, DSL, connection. Gateway 160 may be capable to communicate with internet 140 by means of connection 165 and by further gateways by means of connection 167, which may both be wire-line connections or wireless connections. It is also possible that gateway 160 is absent, and access point 150 is directly connected to internet 140.

Responsive to a user of a mobile 110 requesting information from a network, such as internet 140, mobile 110 may be configured determine whether it has a connection already, or whether it is in an idle mode without a connection. Responsive to a determination that mobile 110 is in idle mode without a connection, mobile 110 may be configured to initiate connectivity to internet 140 via the cellular or non-cellular route. The initiating may comprise, for example, establishing a radio bearer to base station 120 or access point 150, resolving an address using a domain name system, DNS, server, and establishing a protocol connection to a node comprised in the network.

Many users value swift access to requested information, wherefore delays in presenting requested information to users are undesirable for many users. For example, when a user activates a link to a web page, he may be pleased to see the page appear on a display comprised in mobile 110 quickly. In the other hand, if a compound delay after activating the link is long, the user may be displeased or even give up on waiting for the web page to be displayed, thinking that an error has prevented access to the page.

To address the question of reducing waiting times, some embodiments of the present invention allow mobile 110 to predict when a user will request information from a network. Accordingly, if mobile 110 is in an idle state without network connectivity, responsive to it predicting that a user will soon request information from a network, mobile 110 may be configured to initiate actions toward establishing connectivity even before the user requests the information, for example by activating a link. In this case, a compound delay is at least partly past by the time the user requests information and the delay from the actual user request to receiving the information in mobile 110 is shorter.

In general, an apparatus may be configured to receive at least one indication of user activity that the apparatus is configured to use as a trigger for predicting a future need for a packet-based connection. Receiving the at least one indication may take place via a user interface receiver, which may be, for example, a keypad or touchscreen comprised in mobile 110 or a receiver comprised on a processor or chip, the receiver being operably connectable to a keypad, touchscreen or other user interface.

Responsive to receiving the at least one indication, the apparatus may be configured to initiate packet-based connectivity. The initiating may comprise initiating packet-based connectivity over a radio interface. The initiating may occur promptly responsive to the at least one indication or after a delay. A delay may depend on which kind of indication or indications are received. The initiating may be performed by at least one processing core comprised in the apparatus.

The at least one indication of user activity may comprise at least one indication relating to operating a web browser. In order to be usable in predicting a future request to fetch a resource for displaying on a browser, the at least one indication cannot comprise a request to fetch a resource from a network.

A first example of an indication of user activity that is usable for predicting a future need for a packet-based connection is an indication that a user has invoked a web browser. Invoking a web browser may comprise selecting a web browser from a user interface of an operating system, for example. When a user wants to access a web page, he may first invoke, or start, a web browser and then instruct the browser to fetch the web page. Therefore by initiating packet-based connectivity already responsive to the invocation of the web browser, the delay from the actual request for information to the availability of the information in the apparatus is shortened.

A second example of an indication of user activity that is usable for predicting a future need for a packet-based connection is an indication that a user has opened a list of bookmarks in a browser. A list of bookmarks may comprise uniform resource locators, URLs, or internet protocol, IP, addresses and associated information. When a user wants to access a web page that is included in the bookmarks list, he may first open the bookmarks list and then use it to request the web page. Therefore the opening of the bookmarks list precedes the actual request for accessing the web page, and is therefore usable for predicting a need for a packet-based connection.

A third example of an indication of user activity that is usable for predicting a future need for a packet-based connection is an indication that a user scrolls up or down a web page. Web pages may comprise links to further web pages, and as a user scrolls along a page links not previously visible may become visible on a display. Since a link can only be invoked once it becomes visible, scrolling may be used for predicting a need for a packet-based connection. In some embodiments, scrolling triggers initiation of packet-based connectivity only when it results in at least one link becoming visible on a display.

A fourth example of an indication of user activity that is usable for predicting a future need for a packet-based connection is an indication that a user zooms a display of a browser to a section of a web page. Zooming means that instead of displaying a larger section, or all, of a web page a smaller section is displayed. Zooming may be desirable to make text on a web page more legible on a small screen, for example. When the area to which the user zooms comprises at least one link, the apparatus is in some embodiments configured to initiate packet-based connectivity.

A fourth example of an indication of user activity that is usable for predicting a future need for a packet-based connection is an indication that a user enters a uniform resource locator, URL, on a web browser. For example, when a user enters the URL "http://www.nokia.com" the user will request the web page of Nokia Corporation, headquartered in Espoo, Finland. The apparatus is in some embodiments configured to initiate packet-based connectivity responsive to realizing that the user is entering an URL, for example responsive to receiving as input "www." since many URLs begin with those characters. Alternatively, a triggering event can be that the user invokes a text-entry field that the web browser uses for inputting URLs.

In some embodiments, the apparatus is configured to use as triggers indicators that have in the past preceded requests to fetch a resource from a network. The apparatus may in these embodiments be configured to observe user behaviour and adaptively learn when he is likely to request a network resource. For example, the apparatus may learn that the user often requests a network resource immediately after deactivating an alarm clock feature in the morning. Therefore for this user, an indication of alarm deactivation can be used as a trigger, especially so if it occurs in morning hours. Another example is that the apparatus learns that a user takes at least 5 seconds to select a link from a bookmarks list. In such a case, the apparatus may delay the initiation of packet-based communication after the opening of the bookmarks list by a few seconds, since otherwise the packet-based connection would be ready unnecessarily early.

Initiating packet-based connectivity may comprise initiating establishment of a radio bearer. Establishing a radio bearer may commence by the mobile 110 transmitting a request for a bearer to base station 120 or access point 150, for example. Radio bearer establishment takes place according to procedures defined for each radio access technology.

In some embodiments, initiating packet-based connectivity may comprise initiating address resolution, for example by resolving addresses of URLs using a DNS service. For example, the apparatus may be configured, responsive to an indication of user activity, for example an indication that a bookmarks list has been opened, to resolve the addresses associated with all URLs comprised in a bookmarks list in addition to establishing a radio bearer. The apparatus may be configured to prioritize resolution of addresses associated with URLs the user accesses more frequently, based on stored history information. Where the apparatus determines that a radio bearer is already established, it may be configured to resolve addresses associated with any links that become visible on a display due to user scrolling on a web page. Initiating packet-based connectivity may thus comprise at least one of initiating establishment of a radio bearer and initiating address resolution.

In some embodiments, initiating packet-based connectivity may comprise initiating at least one protocol connection to at least one network resource. Examples of network resources include a web page and a server. For example, where a radio bearer is already established and an address to the resource is already resolved, initiating packet-based connectivity may comprise initiating at least one protocol connection to at least one network resource. Examples of protocol connections include transmission control protocol, TCP, connections and real-time transport protocol, RTP, connections.

Figure 3:
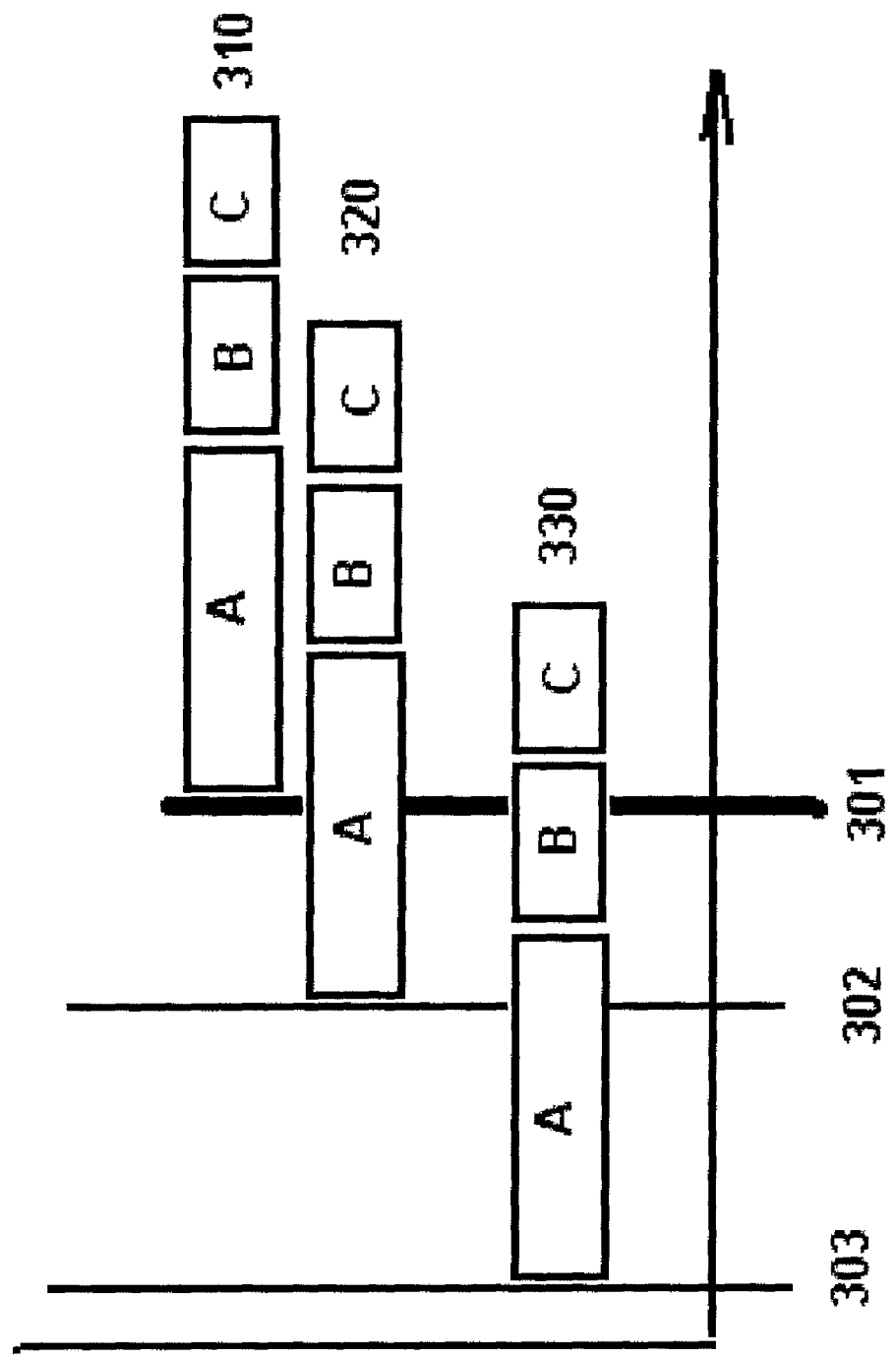
FIG. 3 illustrates timing features related to some embodiments of the present invention.

FIG. 3 illustrates timing features related to some embodiments of the present invention. In the figure, the horizontal is associated with time, which increases from left to right. Time instant 301 corresponds to a time instant when a user actually requests fetching a resource, for example for displaying on a browser. Time instant 302 corresponds to a triggering event that can be used to predict event 301, and time instant 302 corresponds to another, earlier, triggering event usable to predict event 301. Rectangular elements in the figure correspond to delays caused by various stages of establishing packet-based connectivity. Delay A corresponds to the delay associated with establishing a radio bearer. Delay B corresponds to the delay associated with resolving at least one address. Delay C corresponds to the delay associates with establishing a protocol connection to a remote device. The illustrated lengths of the delays are not to be construed in a limiting sense, although in some embodiments delay A is longer than delays B or C.

The case labeled 310 relates to a case where no predicting is done. Responsive to a user request, the apparatus initiates first a radio bearer, then resolves an address and then forms a protocol connection to a remote device, after which data transfer can take place. The compound delay A+B+C must elapse in full before data transfer can occur, and the user must wait for the entire compound delay before seeing any information responsive to his request 301.

The case labeled 320 relates to a case where a trigger event 302 is used by the apparatus to initiate establishment of a radio bearer already before the actual user request 301. The compound delay A+B+C in this case runs from the trigger event 302 which precedes request 301, and therefore data transfer can begin sooner than in the case labeled 310. The user will notice a shorter delay, which facilitates web browsing and improves his user experience.

The case labeled 330 relates to a case where a trigger event 303 is used by the apparatus to initiate establishment of a radio bearer and initiate resolving at least one address before the actual user request 301. The compound delay A+B+C runs from an earlier trigger, wherefore the radio bearer is in this case established already before the actual user request 301, and the apparatus can also initiate address resolution before the actual user request 301. As can be seen from the figure, this case is associated with a shorter delay from request 301 to expiry of the compound delay A+B+C, and correspondingly better user experience, than in case 310 or case 320.

As described above, in some cases the radio bearer may be established already, for other reasons, when a triggering event such as event 302 or 303 is encountered. In these cases, the apparatus may be configured to proceed directly to resolving at least one address and initiating a protocol connection responsive to the trigger event. In such cases the compound delay would correspond to delay B+C. If also the relevant address or addresses are resolved, the apparatus may be configured to initiate the protocol connection directly responsive to the trigger event, and the delay would comprise only delay C. The address may be considered as already resolved, if the apparatus has recently resolved the address in question and stores the corresponding information in an internal memory. The stored in formation may be associated with an expiry time, after which it may be deleted from the internal memory. The expiry time may be a default value or it may be received from a DNS server responsive to an inquiry comprised in the address resolution process.

Figure 4:
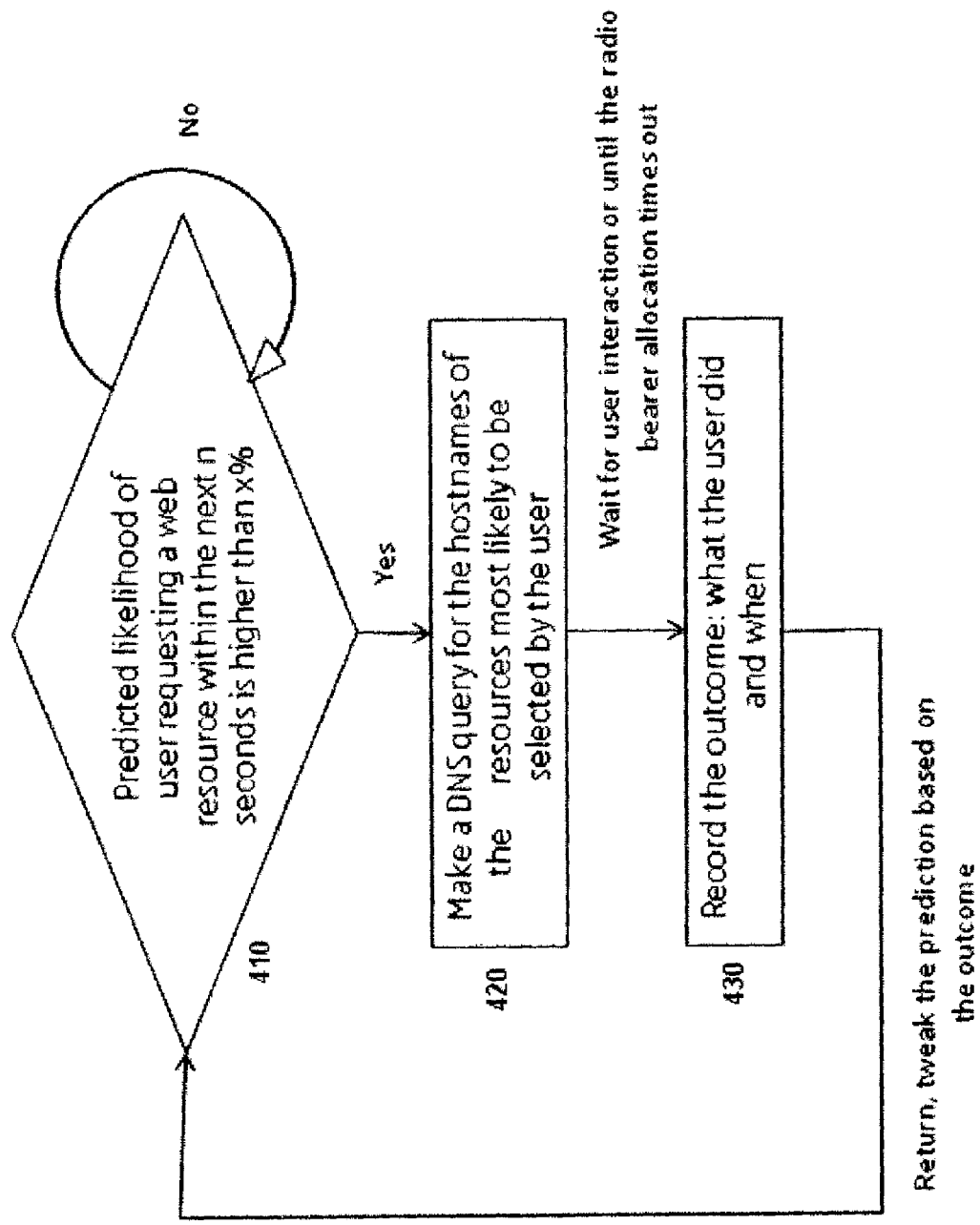
FIG. 4 is a flowgraph of a process in an embodiment of the invention.

FIG. 4 is a flowgraph of a process in an embodiment of the invention. In this embodiment, the apparatus is configured to use as triggers indicators that have in the past preceded requests to fetch a resource from a network. The apparatus may in these embodiments be configured to observe user behaviour and adaptively learn when he is likely to request a network resource. The apparatus in this embodiment stores in a memory information of indicators that have in the past preceded requests to fetch a resource from a network, for example user interface actions relating to using a browser or invoking applications or menus.

In phase 410, the apparatus monitors whether the user takes actions concerning which it has stored information in the memory. When the user takes such an action, the apparatus observes from the stored information how likely, based on stored statistics, is it that the user will soon enter a request such as request 301 of FIG. 3. For example, the actions may include opening a menu from which it is possible to invoke a web browser, invoking the web browser, opening a bookmarks menu, scrolling down a web page, zooming in a web page or entering at least part of an URL. The stored statistical information may indicate, the probability calculated from past occurrences of the actions that the user will issue an actual request for content. Responsive to the detected action being associated in the past with an actual request for content more frequently than a threshold frequency, the apparatus is in this embodiment configured to use the action as a trigger for initiating packet-based connectivity, phase 420.

In phase 430, the apparatus determined if the user in fact issued the actual request for content. Since the apparatus statistically predicted the actual request, it is possible that the user nonetheless didn't issue the actual request for content, such as a web page. In phase 430, the apparatus records in the stored statistical information whether the user issued the actual request within a certain time period, such as a few seconds. The stored statistical information may include, for example, the number of times the user has performed the or each action and the number of times the action has preceded an actual request for content within the certain time period, which may be configurable. Using the information, the apparatus may then each time calculate the statistical probability that the action can successfully be used as a predictive trigger. The apparatus can also adapt to changing user behaviour by storing new information based on the user's actions.

Figure 2:
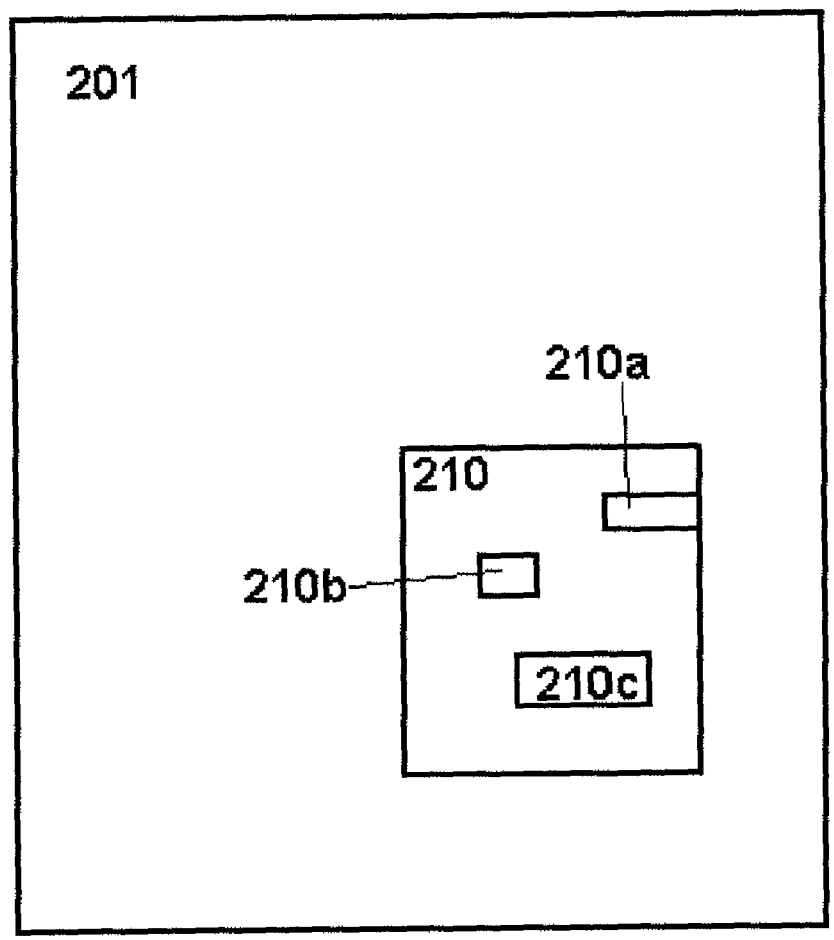
FIG. 2 illustrates an example apparatus 201 capable of supporting embodiments of the present invention.

FIG. 2 illustrates an example apparatus 201 capable of supporting embodiments of the present invention. The apparatus may correspond to mobile apparatus 110 or base station 120, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example information on past user behaviour. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna Although described in the foregoing principally in light of packet-based connectivity, some embodiments of the present invention comprise that a circuit-switched bearer is initiated responsive to a triggering indication of user activity.

Without in any way limiting the scope, interpretation, or application of the claims appearing below, a technical effect of one or more of the example embodiments disclosed herein is that delays are reduced in packet-based communication. Another technical effect of one or more of the example embodiments disclosed herein is that apparatuses can adapt to changing user behaviour, or changes in user caused for example by the apparatus being sold or transferred to a new user. Another technical effect of one or more of the example embodiments disclosed herein are reduced delays in user interfaces as an apparatus waits for a packet-based connection to be formed.

Embodiments of the present invention may be implemented in software, hardware, application logic or a combination of software, hardware and application logic. The software, application logic and/or hardware may reside on memory 210b or control apparatus 210. If desired, part of the software, application logic and/or hardware may reside on memory internal to the control apparatus, and part of the software, application logic and/or hardware may reside on memory external to the control apparatus. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code
   the at least one memory and the computer program code configured to, with the at least one processor, cause the apparatus to perform at least the following:
   receive at least one indication of user activity;
   initiate establishment of a radio bearer for packet-based connectivity responsive to the at least one indication of user activity;
   wherein the at least one indication of user activity comprises at least one indication relating to operating a web browser, the at least one indication relating to operating a web browser not indicating a user request to fetch a resource for display on the browser, wherein the at least one indication of user activity comprises an indication of at least one of an opening of a list of bookmarks in the web browser, scrolling on a web page in the web browser, zooming on a web page in the web browser and entering characters of a uniform resource locator in the web browser.

2. The apparatus according to claim 1, wherein the at least one indication of user activity comprises an indication of an action which has according to information stored in the apparatus in the past preceded a user request to fetch a resource for display on the web browser.

3. The apparatus according to claim 1, wherein initiating packet-based connectivity over a radio communications interface comprises initiating address resolution.

4. The apparatus according to claim 3, wherein initiating packet-based connectivity over a radio communications interface further comprises initiating application-layer connections to resolved addresses.

5. The apparatus according to claim 1, wherein the apparatus comprises a mobile communication device, the apparatus further comprising an antenna coupled to a radio transceiver configured to provide signals to the radio transceiver.

6. A method, comprising:
   receiving at least one indication of user activity;
   initiating establishment of a radio bearer for packet-based connectivity responsive to the at least one indication of user activity;
   wherein the at least one indication of user activity comprises at least one indication relating to operating a web browser, the at least one indication not indicating a user request to fetch a resource for display on the browser, wherein the at least one indication of user activity comprises an indication of at least one of an opening of a list of bookmarks in the web browser, scrolling down a web page in the web browser, zooming on a web page in the web browser and entering characters of a uniform resource locator in the web browser.

7. The method according to claim 6, wherein the indication of user activity comprises an indication of an action which has according to information stored in the apparatus in the past preceded a user request to fetch a resource for display on the web browser.

8. The method according to claim 6, wherein initiating packet-based connectivity over a radio communications interface further comprises initiating address resolution.

9. The method according to claim 8, wherein initiating packet-based connectivity over a radio communications interface further comprises initiating application-layer connections to resolved addresses.

10. A computer program product comprising a non-transitory computer-readable medium bearing computer program code embodied therein for use with a computer, the computer program code comprising:
    code for receiving at least one indication of user activity;
    code for initiating establishment of a radio bearer for packet-based connectivity responsive to the at least one indication of user activity, wherein the at least one indication of user activity comprises at least one indication relating to operating a web browser, the at least one indication not indicating a user request to fetch a resource for display on the browser, wherein the indication of user activity comprises an indication of at least one of an opening of a list of bookmarks in the web browser, scrolling down a web page in the web browser, zooming on a web page in the web browser and entering characters of a uniform resource locator in the web browser.

* * * * *